Jan. 26, 1926.  
C. E. ROGERS  
1,570,646
METHOD OF PASTEURIZING AND DEODORIZING CREAM
Filed March 22, 1923     3 Sheets-Sheet 1
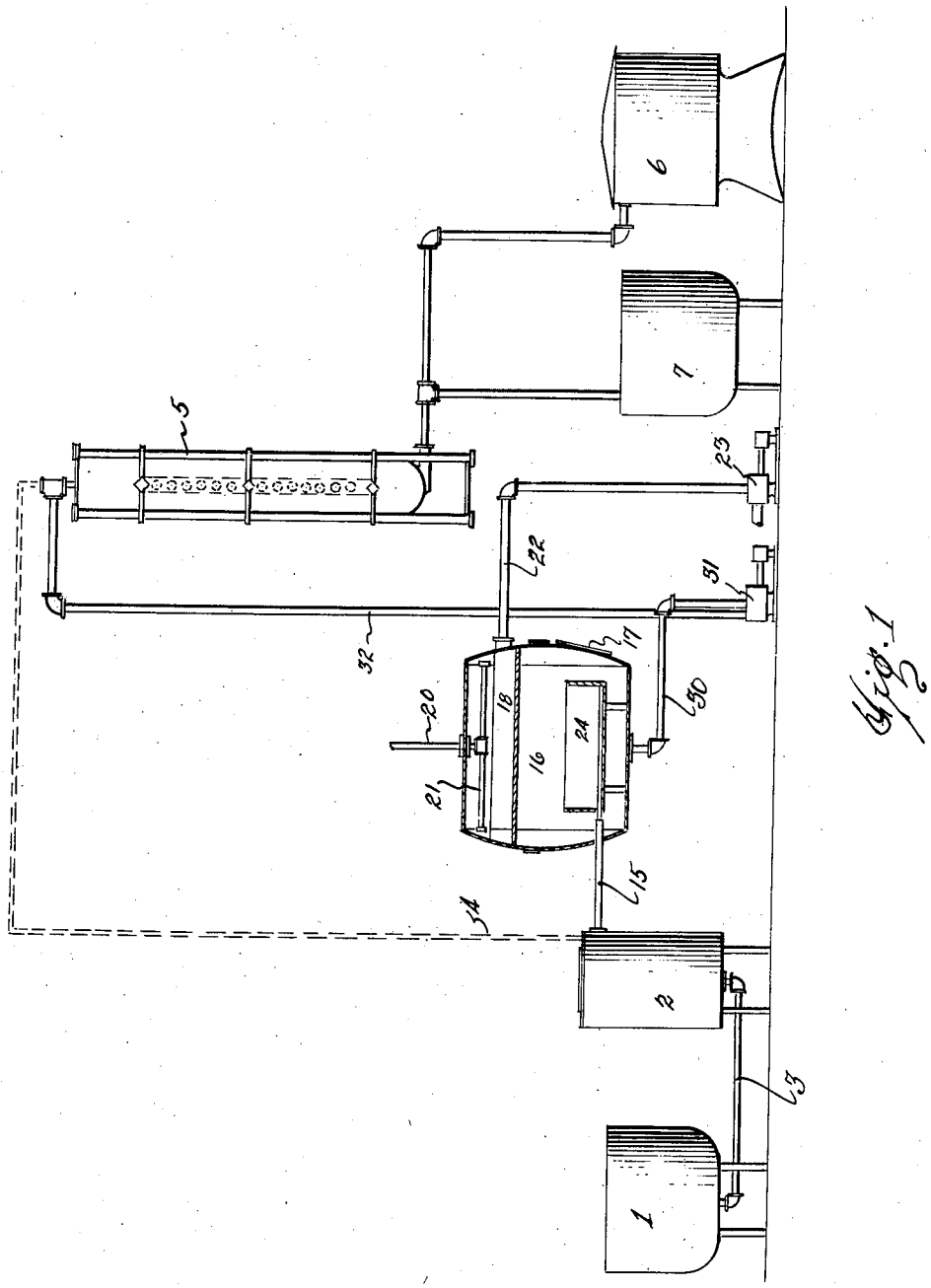
INVENTOR.
BY    *Charles E. Rogers*
ATTORNEY.

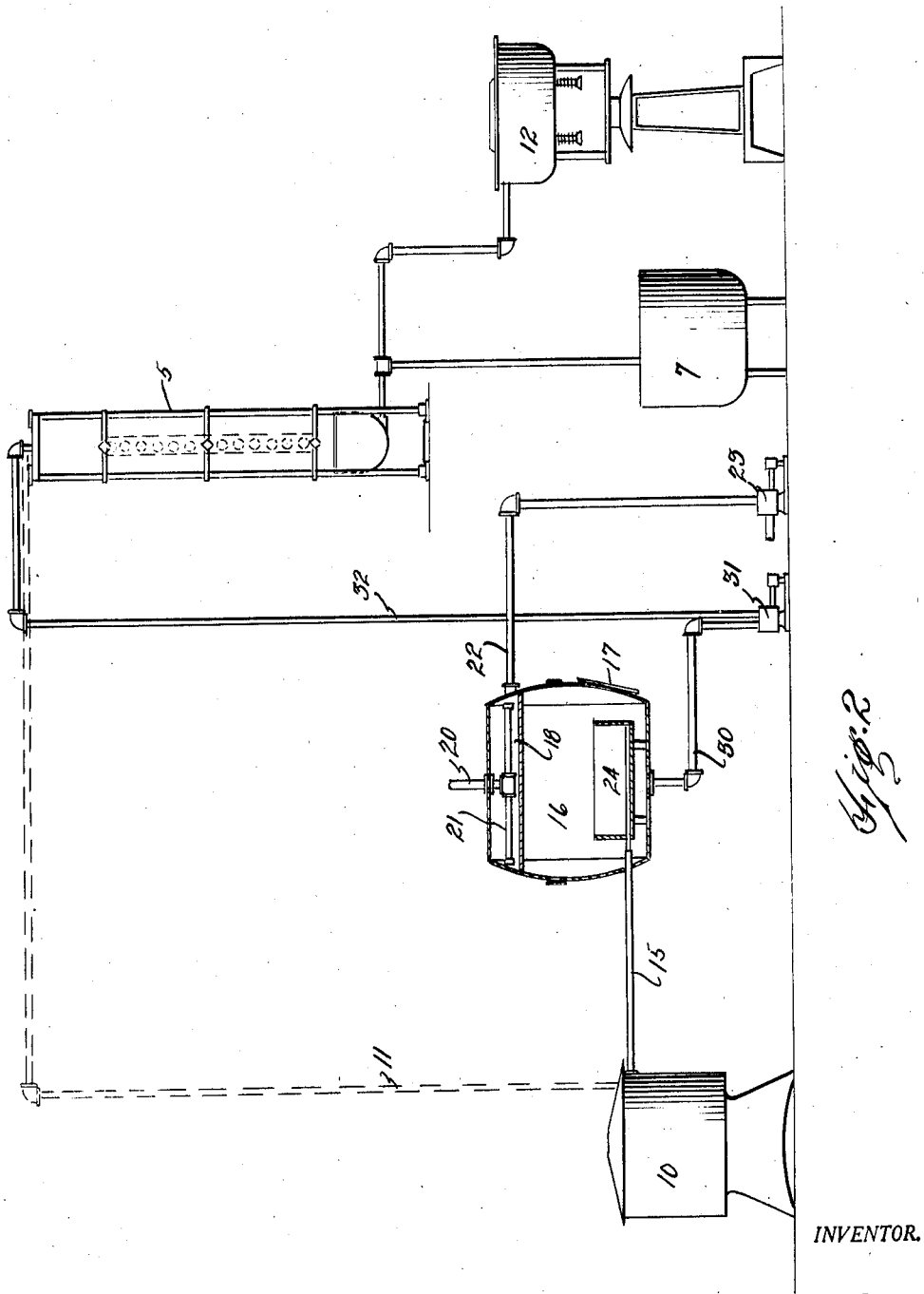

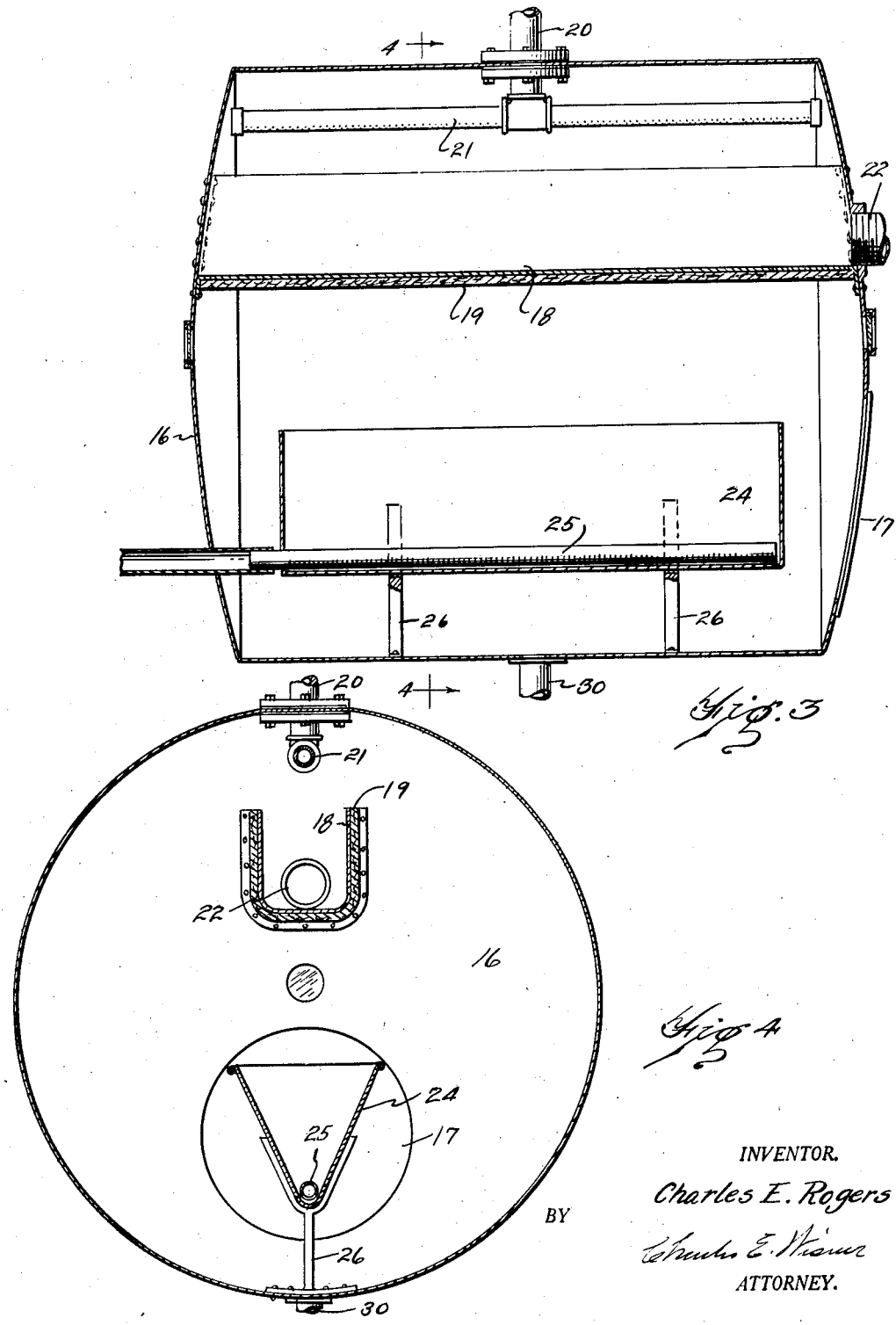

Patented Jan. 26, 1926.

1,570,646

UNITED STATES PATENT OFFICE.

CHARLES E. ROGERS, OF DETROIT, MICHIGAN.

METHOD OF PASTEURIZING AND DEODORIZING CREAM.

Application filed March 22, 1923. Serial No. 626,813.

*To all whom it may concern:*

Be it known that I, CHARLES E. ROGERS, a citizen of the United States, residing at Detroit, county of Wayne, and State of Michigan, have invented a certain new and useful Improvement in Methods of Pasteurizing and Deodorizing Cream, and declare the following to be a full, clear, and exact description of the same, such as will enable others skilled in the art to which it pertains to make and use the same, reference being had to the accompanying drawings, which form a part of this specification.

This invention relates to a method of pasteurizing and deodorizing milk, cream and other liquid foods for general use and for use in butter and cheese making. The principal object is to provide a process whereby detrimental odor and the deleterious volatile matter is removed from the liquid during preparation for general consumption. With methods now in use in the pasteurizing of milk or cream, a considerable percentage thereof is below standard grade due to the fact that the character of food with which the cattle are supplied produces various strong odors and flavors in the milk and cream and again oftentimes creams is stored for a period during which time it absorbs odors from surrounding material, for instance stored vegetables, and also acquires an objectionable lactic acid content.

My particular object in this invention is to provide a method whereby milk or cream, known to the trade as "off grade," may be pasteurized and deodorized in the process by elimination of all deleterious volatile matter, odors and flavors restoring the milk or cream to prime grade and when used in cheese or butter making productive of cheese or butter of the highest grade.

In methods of butter making at present in use in creameries, as high as forty per cent of the product is what is known as "off grade." This is a great waste as it is necessarily sold at a reduced price in the market although the cost of production is as high as with A-1 grade butter.

With my improved method and apparatus, these deleterious odors and flavors are practically completely removed from the milk or cream during the pasteurizing process and thus the cream resulting from the process has that much desired "new cream" odor and flavor, and the butter produced therefrom is likewise free from deleterious odors and flavors. This general object and various novel features of the invention and the apparatus by means of which the method may be performed are hereinafter more fully described and claimed, and the preferred form and arrangement of the mechanism required in the performance of my improved method is shown in the accompanying drawings in which—

Fig. 1 is a diagram showing my improved process in which the milk or cream flows directly from the pasteurizer as fast as it is discharged thereinto.

Fig. 2 is a similar diagram showing the arrangement of parts when used with what is known as the "holding system" of pasteurization in which the product is held at a certain temperature for a period of time.

Figs. 3 and 4 respectively show a longitudinal and transverse section of a vacuum chamber used in the performance of my new method.

The improved method may be used with either of the general methods of pasteurizing cream—that is, with what is known as the "continuous method" and with what is known as the "holding method" of pasteurization. Preferably, what is known as the "continuous method" of pasteurizing milk or cream for instance is shown in Fig. 1 and is as follows.

The cream is first placed in a vat 1 and from this it flows to a heater 2 which is built with an interior agitator (not here shown) running at such high velocity that it will elevate the product passing through it. The cream flows into the heater at the bottom by the line 3 and out at the top through the line 4, shown by dotted lines, to the usual pipe cooler 5 where it flows over the pipes containing cold water or brine, and from thence it may run to what is known as the ripening tank 6 or into a cream vat 7 where it is allowed to stand until it requires the proper degree of acidity for butter making. In the "holding method" of pasteurizing cream, as indicated in Fig. 2, milk or cream is put into a tank 10 which is provided with means for heating and the product is there heated to about 142 degrees F., and held at that temperature for approximately thirty minutes. It is then pumped by a pump (not here shown) through the pipe line 11, shown by dotted lines, to the cooler 5 as in the first instance and from there it runs to the usual cream vat 7 of the first case or to a bottling machine 12 where it may be bottled for the market.

With either of these previous known methods, as above described, the cream and the butter made from the cream, if the cream be of poor grade, has all the poor flavor and odors of the original cream.

I propose to so treat the milk or cream either for butter making or for bottling purposes and general consumption or for cheese making in a manner to completely eliminate such bad odors and flavors of the milk or cream, and the product made therefrom. In either case the cream for instance runs from the pasteurizer heater of Fig. 1 directly to the cream line 15 or from the ripener 10 of Fig. 2 directly to the cream line 15. This cream line enters what I have called a vacuum chamber 16 and this is shown in detail in Figs. 3 and 4. This vacuum chamber may be of various forms. I prefer, however, to utilize the cylindrical form here shown. This consists of a tank 16 preferably of cylindrical form provided with a manhole, indicated at 17. In the top of the tank 16 is provided a U shaped trough 18 shown clearly in section in Fig. 4, and this is covered with insulation 19 on the outer side. A water inlet 20 is provided leading into the top of the tank and terminating therein in a longitudinally extending pipe 21 provided with a series of small apertures on the lower side through which water is discharged in fine streams into the trough 18. It is to be noted that the line 21 is placed somewhat above the trough and any vapors arising in the tank pass upward and into the spray and are condensed and pass out through the water outlet 22 which is of sufficient capacity to withdraw the water and volatile gases passing upward to the top of the tank. The pump, shown at 23 in Fig. 2, draws the water from the trough and, due to action of the pump and the condensation taking place in the tank, a high degree of vacuum may be maintained therein, or such degree of vacuum may be maintained as may be desired which is controlled by operation of the pump and amount of water used in condensing passing the line 21.

In the bottom of the tank I have provided a receptacle substantially V shaped in cross section indicated at 24. This has sloping side walls and vertical end walls and in the bottom thereof is a pipe 25 having a series of slots cut in the under surface thereof and the forward end of the pipe, as is shown in Fig. 4, has slip connection with the pipe 15 leading into the pan. This receptacle 24 is supported on standards 26 and the receptacle is removable from the standards through the manhole. The fluid treated is withdrawn from the bottom of the tank through the line 30 and pump 31 which discharges to the cooler 5 through the line 32.

In utilizing my system with the "continuous method" of pasteurizing, the milk or cream is heated in the flash heater 2 to about 180 to 185 degrees F., and assuming a vacuum of 24½ inches is maintained in the tank, the milk as it flows into the pan through the line 15 and the line 25 will foam due to the rapidity with which the heat leaves the fluid as the boiling point in the tank under the assumed condition is approximately 130 degrees F. This foam rises in the V shaped receptacle and runs down the outside thereof to the bottom of the tank to the outlet. In passing from the pipe into the receptacle and thence overflowing into the tank, the cream first foams as stated and then coagulates as it flows down over the sides of the receptacle and becomes liquid in form and is continuously drawn from the vacuum chamber. As this cream is brought in at 180 degrees into the assumed vacuum of 24½ inches, the fall in temperature is to about 130 degrees or approximately 50 degrees drop. This cools the product very rapidly; in fact is the quickest known method of cooling the product. This is pumped out continuously and over the cooler 5 where it is cooled to the desired temperature and run either into the ripening vat or, if it is to be used consumption, is passed to the bottling device indicated at 12 which may be used with either system.

With the "holding method", the product is held in the ripener 10 at approximately 142 degrees F., for about thirty minutes. This cream is then discharged directly into the vacuum chamber as in the first instance although due to its not being heated so highly in the second method, the drop in temperature is not so great in the vacuum chamber.

It may be observed from the foregoing description of the two methods that the invention herein disclosed consists in the taking of the cream from the flash heater or from the ripener of the "holding" system and then treating it previous to passing to the usual cooler. This treatment consists in subjecting milk or cream heated to a temperature above the boiling point of the vacuum cooler and discharging it thereinto in a continued stream and continuously removing it thereform so that no material quantity of the fluid is subjected to the vacuum at any single period, and that in so passing it into the vacuum chamber, the heat is made to leave the product with great rapidity breaking the hardened casein and freeing the volatile material in the cream. It is to be understood that the cause of the deleterious odors and flavors in cream and butter are caused by volatile matter which it either has absorbed or acquired through improper feeding of the cattle and thus the subjection of the milk or cream to a sufficiently high degree of heat (below that productive of detrimental effect), this volatile matter can be driven off from the cream. In my method, this is driven off through the influence of a vacuum; is brought to a condenser, the condensable volatile gases and the noncondensable are drawn off from the vacuum chamber through the outlet 22, and the cream drawn off from the vacuum chamber is thus fresh in character having no detrimental odors or flavors.

Manifestly, butter made from this cream is of the highest grade and cream that has stood for a period, and cream that is below standard grade can be brought to perfect condition and utilized without loss, and what is now very largely a waste occasioned by use of a cream that is below standard grade is eliminated.

I am aware of the commonly known vacuum pans used in the condensing of milk and the like in which volatile matter may be driven off from the cream or milk in the condensing thereof, but such previous type of vacuum pan is unadapted for use in the preparation of milk or cream for cheese or butter making for the following reasons:

With the ordinary vacuum pan a considerable quantity of the liquid treated is boiled in the vacuum pan by heat applied to the fluid while under the vacuum usually by steam coils within the pan. This tends to harden the casein and to form globules of butter fat enclosed in the hardened casein and, while some volatile matter is driven off and withdrawn from the pan by the usual pump and condenser, yet it is far from complete removal of volatile matter and butter made from product treated in this manner with the previous known vacuum pans is not high grade, but what is known as "short grain" butter and detrimental odors and flavors are retained in the product. My method therefore achieves a new result in that the butter produced from cream treated in the manner heretofore described is not hard or tallow like as with the "short grain" butter produced when the old type of vacuum pan is utilized and cream is not condensed in the vacuum cooler herein disclosed as it simply flows into the vacuum chamber and is withdrawn therefrom as rapidly as it is discharged thereinto. This present vacuum cooler is not heated and, while the milk or cream is heated previous to the introduction into the cooler during which heating the casein and curd content becomes hardened more or less as in the ordinary vacuum pan, yet on discharging this fluid, heated to the temperature mentioned, into the cooler and due to the rapid discharge of the heat therefrom as before mentioned, the hardened particles break which frees the butter fat globules permitting the volatile matter to pass off. The fluid then flows from the cooler in practically perfect condition without the presence of deleterious odors or flavors. This "breaking" of the hardened particles and film covered butter fat globules as the fluid enters the chamber is believed an essential characteristic of my method as applied to the treatment of milk and cream. The abstraction of heat from the fluid is so rapid as to cause practically an "explosion" of the particles resulting in disintegration thereof as well as freeing the butter fat.

I have herein stated the temperature at which my process may be performed with milk or cream, but I am not to be understood as limiting myself to any particular temperature or any character of construction of the vacuum cooler except that the construction shall be such that the fluid treated may pass into the cooler and is then practically immediately withdrawn from the influence of the vacuum and cooled down to the desired temperature in the usual way in such manner as not to chemically or physically change the butter fat in the product. To recapitulate the fluid to be treated is first heated and the temperature to which it is heated may vary with the product being treated and, with milk or cream, it may also be varied between certain limits. This heated fluid is then discharged into the vacuum chamber by such degree of exhaust as to instantaneously cool the heated inflowing fluid to the temperature of the boiling point of the vacuum and is immediately withdrawn from the vacuum chamber. There is therefore a drop of several degrees between the inflowing and the outflowing liquid and the heat leaves the inflowing fluid so instantaneously as to cause liberation of volatile matter, gases, acids, etc., and the condensable gases and also the non-condensable gases are drawn off with the condensing water. This release of the heat is so violent as to carry these non-condensable gases to the condenser. In order to insure rapid flow of volatile gases and acids from the chamber the distance between the point of introduction of the fluid and the point where the gases and vapors may contact the condensing water is not more than two feet in the preferred form. It is also to be noted that there is in reality no attempt to condense the fluid in this vacuum chamber differing from the usual vacuum pan in this respect. There is naturally some watery vapor that will be discharged and therefore a slight condensation by this is merely incidental to the process.

The previous description is largely confined to a description of the use of the process in the purification of the milk and cream, it being understood that milk may be treated by this process for use in the making of cheese, and that cream may also be similarly treated for the purpose of butter making or for table use, the principal object being to take the usual milk and cream product, a large percentage of which has always more or less been below standard grade, and to so treat it as to bring it to standard condition for the various uses for which the product is ordinarily employed. It is also to be understood that other fluids containing disagreeable or detrimental odors or flavors may be treated by this process, and that the process therefore is not confined to the particular material treated as any fluid containing more or less obnoxious volatile matter can be cleansed of such matter in the same general way as is herein described relative to milk or cream.

Having thus fully described my invention, what I claim is—

1. In a method of treating liquids for the removal of volatile matter, odors and flavors, the step consisting in momentarily subjecting the heated fluid to influence of a vacuum in an unheated vacuum chamber in a manner to practically instantaneously reduce the temperature of the liquid and thereby discharge the volatile matter from the body of the liquid.

2. The method of treating fluids for the removal of volatile matter, odors and flavors, the steps consisting in first heating the fluid and then discharging the same into an unheated vacuum chamber of such degree of exhaust as to cause an instantaneous drop in temperature of the fluid thereby releasing the volatile matter with the discharge of heat, and withdrawing the fluid from the chamber as rapidly as it is discharged thereto.

3. The herein described method of treating fluids for the removal of volatile matter, gases, flavors, etc., consisting first in heating the fluid then discharging the heated fluid into an unheated vacuum chamber of such degree of exhaust as to cause an instantaneous drop in temperature and thereby release the said volatile matters, gases, etc., drawing off the treated fluid as rapidly as it is discharged into the chamber, and finally cooling the same.

4. The method of treating milk or cream for the removal of detrimental odors or flavors consisting in passing heated fluid into an unheated vacuum chamber of such degree of exhaust as to cause an instantaneous drop in the temperature of the fluid, and withdrawing the treated fluid before the soft oil of the butter fats becomes hardened.

5. The method of purifying lacteal fluid which consists in first heating the fluid to about a pasteurizing temperature causing the same to flow while at such temperature into an unheated vacuum chamber of such degree of exhaust as to instantaneously cool the fluid whereby the fluid is freed of the volatile matter and gases, and withdrawing the fluid from the chamber previous to detrimental chemical or physical change through influence of the inflowing fluid or of the gases in the chamber or condensation of the fluid to a detrimental extent.

6. The herein described method of treating lacteal fluid for removal of volatile matter, gases, ordors, etc. consisting in heating the fluid to a temperature below that productive of detrimental change in the butterfat and at which the casein and curd content becomes hardened, then passing the fluid while at such temperature into an unheated vacuum chamber of such degree of exhaust as to cause an immediate drop in the temperature of the fluid to the temperature of the boiling point of the vacuum thereby liberating the volatile matter, gases, etc., with the heat causing the casein and curd content to break and releasing the butterfat globules to influence of vacuum, the said volatile matter, gases, etc., passing through the condenser out of the vacuum chamber, withdrawing the treated fluid previous to possible detrimental chemical or physical change in the chamber, and finally cooling the fluid.

In testimony whereof, I sign this specification.

CHARLES E. ROGERS.